(12) United States Patent
Park et al.

(10) Patent No.: US 6,993,822 B2
(45) Date of Patent: Feb. 7, 2006

(54) METHOD FOR MANUFACTURING STATOR OF MOTOR FOR WASHING MACHINES

(75) Inventors: Jin Soo Park, Inchun-si (KR); Cah Seung Jun, Seoul-si (KR); Tae Heoung Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/321,393

(22) Filed: Dec. 18, 2002

(65) Prior Publication Data

US 2004/0068857 A1    Apr. 15, 2004

(30) Foreign Application Priority Data

Oct. 10, 2002    (KR)    ...................... 10-2002-0061854

(51) Int. Cl.
*H02K 15/14*    (2006.01)
(52) U.S. Cl. .............................. 29/596; 29/596; 68/140
(58) Field of Classification Search ................. 29/596, 29/598, 609, 732; 310/254, 42; 72/142, 72/371; 8/159; 68/12.02, 12.14, 23.6, 140, 68/3 R
See application file for complete search history.

(56) References Cited

U.S. PATENT DOCUMENTS

| | | | | |
|---|---|---|---|---|
| 356,902 | A | * | 2/1887 | Thomson ..................... 310/264 |
| 4,102,040 | A | * | 7/1978 | Rich ............................ 29/598 |
| 4,116,033 | A | * | 9/1978 | Iwaki et al. .................. 29/596 |
| 4,316,112 | A | * | 2/1982 | Waldron et al. ............ 310/258 |
| 4,395,815 | A | * | 8/1983 | Stanley et al. ................ 29/598 |
| 4,403,489 | A | * | 9/1983 | Munsterman et al. ......... 29/596 |
| 4,813,248 | A | | 3/1989 | Smith et al. |
| 4,853,571 | A | | 8/1989 | Smith et al. |
| 4,914,934 | A | * | 4/1990 | Fritzsche ..................... 29/596 |
| 5,150,589 | A | | 9/1992 | Williams et al. |
| 5,266,855 | A | | 11/1993 | Smith et al. |
| 5,353,613 | A | | 10/1994 | Smith et al. |
| 5,831,366 | A | * | 11/1998 | Kern et al. .................. 310/216 |
| 6,147,431 | A | * | 11/2000 | Asao et al. .................... 29/596 |
| 6,470,563 | B1 | * | 10/2002 | Asao et al. .................... 29/596 |

FOREIGN PATENT DOCUMENTS

| | | |
|---|---|---|
| DE | 3603836 | 10/1986 |
| DE | 4436626 | 1/1996 |
| EP | 0076056 | 4/1983 |
| GB | 1477005 | 6/1977 |
| JP | 58-195449 | 11/1983 |

(Continued)

OTHER PUBLICATIONS

English Language Abstract of JP 2000-116037.

(Continued)

*Primary Examiner*—Minh Trinh
(74) *Attorney, Agent, or Firm*—Greenblum & Bernstein, P.L.C.

(57) ABSTRACT

A method for manufacturing a core of a motor for washing machines. In the manufacturing method, a pair of core bands are formed by punching the electric steel plate so that both core bands are opposite to each other in orientation and the teeth of one core band alternate with the corresponding teeth of the other core band, the core band is wound to a designated height so as to form a ring-shaped core, and securing parts are welded to the inner cylindrical surface of the ring-shaped core so as to be connected to a washing tub by bolts. The manufacturing method of the present invention is simply accomplished, allows the electrical steel plate to be maximally utilized, and improves a degree of strength of the core.

2 Claims, 5 Drawing Sheets

FIG. 6

FOREIGN PATENT DOCUMENTS

| | | | |
|---|---|---|---|
| JP | 9-308143 | | 11/1997 |
| JP | 10-136589 | * | 5/1998 |
| JP | 11-299136 | | 10/1999 |
| JP | 2001-116037 | | 4/2000 |
| RU | 1495928 | | 7/1989 |

OTHER PUBLICATIONS

English Language Abstract of JP 9-308143.
English Language Abstract of JP 11-299136.
English Language Abstract of JP 58/-195449.

* cited by examiner

METHOD FOR MANUFACTURING STATOR OF MOTOR FOR WASHING MACHINES

BACKGROUND OF THE INVENTION

1. Field of the Invention

The present invention relates to a method for manufacturing a core of a motor for washing machines, in which a core band is made of an electric steel plate by punching, and then spirally wound, and then securing parts are welded to an inner cylindrical surface of the wound core band.

2. Description of the Related Art

FIG. 1 is a cross-sectional view of a conventional motor for washing machines.

Generally, a motor for washing machines comprises a housing 2, a stator 10, a rotor 20, and a rotary axis 4. The housing 2 is secured to an outer cylindrical surface of a washing tub (not shown) for washing and spin-drying the laundry. The stator 10 is bolted to the housing 2. The rotor 20 is disposed at the outside of the stator 10 and rotated interactively with the stator 10. The rotary axis 4 is configured so that one end of the rotary axis 4 is rotatably connected to the rotor 20, and the other end of the rotary axis 4 is rotatably connected to a moving vane (not shown) contained within the washing tub.

The stator 10 comprises a core 12 including a ring-shaped yoke 12b and a plurality of teeth 12a regularly spaced on the yoke 12b, and a coil (not shown) wound on the teeth 12a of the core 12 and connected to an external power source. The teeth 12a are formed on the yoke 12b along its circumference and spaced from each other by slots (not shown) formed therebetween. Thus, the stator 10 serves as an armature for generating a rotating magnetic field when current flows into the coil.

Herein, a boss part 16 is protruded from an inner cylindrical surface of the yoke 12b and includes first bolt holes 16a. Since second bolt holes 2a are formed on the housing 2 so as to correspond to the first bolt holes 16a, bolts 6 are inserted into the corresponding first and second bolt holes 16a and 2a and nuts 8 are coupled with ends of the corresponding bolts 6 protruding from the first and second bolt holes 16a and 2a, thereby securing the stator 10 to the housing 2.

The rotor 20 comprises a cuplike rotor frame 22 and a plurality of magnets 24. The rotor frame 22 surrounds the circumference of the stator 10, and one end of the rotary axis 4 is secured to the center of the rotor frame 22. The magnets 24 are fixed to the inner cylindrical surface of the rotor frame 22 so as to be opposite to the stator 10, and operated interactively with the stator 10.

Non-described reference numeral 18a and 18b denote insulators.

When current supplied from the external power source flows into the coil in the above-described motor for washing machines, a magnetic torque is generated between the stator 10 and the magnets 24 and the rotor 20 is rotated in a designated direction so as to minimize its reluctance. As the rotary axis 4 is rotated together with the rotation of the rotor 20, the rotary axis 4 causes the moving vane or an inner tub of the washing tub to rotate, thereby achieving washing and spin-drying functions.

FIG. 2 is a schematic view illustrating a process for manufacturing the core of the conventional motor for washing machines, and FIG. 3 is a flow chart showing the process for manufacturing the core of the conventional motor for washing machines.

The process for manufacturing the core of the conventional motor for washing machines is described as follows.

First, sectional cores 12', each having a sector shape obtained by dividing the ring-shaped core 12 into six equal parts, are formed out of an electric steel plate 25 by punching. A sectional core assembly 12" is formed by stacking a plurality of the sectional cores 12' to a designated height (h). Then, six sectional core assemblies 12" are interconnected in a circumferential direction, thereby completely forming a ring-shaped core 12.

Herein, a recess (a) with a designated shape is formed on one end of a sectional yoke 12b' of the sectional core 12' and a protrusion (b) with a shape complementary with the recess is formed on the other end of the sectional yoke 12b' in the circumferential direction. Therefore, when the sectional core assemblies 12" are interconnected in the circumferential direction so as to form one ring-shaped core 12, the protrusion (b) of one sectional core 12' is inserted into the recess (a) of the neighboring sectional core 12'. Thereby, the sectional core assemblies 12" are electrically and magnetically interconnected.

Interconnecting parts between the sectional core assemblies 12" in the core 12 are welded at the inner cylindrical surface of the core 12. Then, the sectional core assemblies 12" are integrated as one complete ring-shaped core 12.

A pair of insulators 18a and 18b are individually inserted into the upper and lower surfaces of the completed core 12 so as to insulate the core 12 from the exterior, and a coil 14 is wound on each of the teeth 12a of the core 12 a predetermined number of times. Thereby, the stator 10 is completed.

Non-described reference numeral 12c denotes slots of the core 12, and non-described reference numerals 16 and 16a denote the boss part and the first bolt holes as shown in FIG. 1.

In the process for manufacturing the conventional core 12 of the motor for washing machines, after the sectional core 12' is formed of the electric steel plate 25 by punching, a part 25' of the electric steel plate 25 comprising 55~60% of the total size of the electric steel plate 25 remains unused. Thus, the electric steel plate 25 is wastefully consumed.

Further, the protrusion (b) of the sectional core 12' must be inserted into the recess (a) of the neighboring sectional core 12' and the interconnecting parts between the sectional core 12' must be welded, when the sectional core assemblies 12" are interconnected in the circumferential direction. As a result, the manufacturing process is complicated.

Moreover, since the core 12 comprises a plurality of the sectional core assemblies 12" formed by stacking the sectional cores 12', and the sectional core assemblies 12" of the core 12 are easily dislocated vertically at the welded parts, the core 12 has a poor degree of strength, thereby increasing vibration and noise in a high-speed spin-drying mode of the washing machine.

SUMMARY OF THE INVENTION

Therefore, the present invention has been made in view of the above problems, and it is an object of the present invention to provide a process for manufacturing a core of a motor for washing machines, which reduces the wasteful consumption of an electric steel plate, is simply accomplished, and improves a degree of strength of the core.

In accordance with the present invention, the above and other objects can be accomplished by the provision of a method for manufacturing a core of a motor for washing machines comprising the steps of: a core band forming step for forming a core band by punching an electric steel plate, said core band comprising a band-shaped yoke and a plurality of teeth longitudinally protruding from the yoke; a core band winding step for winding the core band to a designated height so as to form a ring-shaped core; and a securing part fixing step for fixing securing parts to the inner cylindrical surface of the ring-shaped core so as to secure the core to a washing tub.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
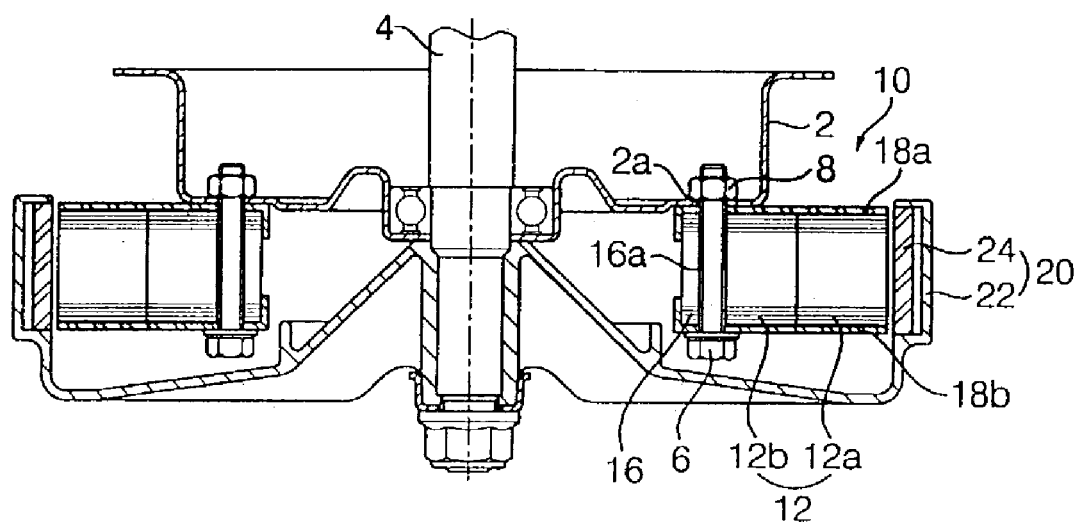
FIG. 1 is a cross-sectional view of a conventional motor for washing machines.
Figure 2:
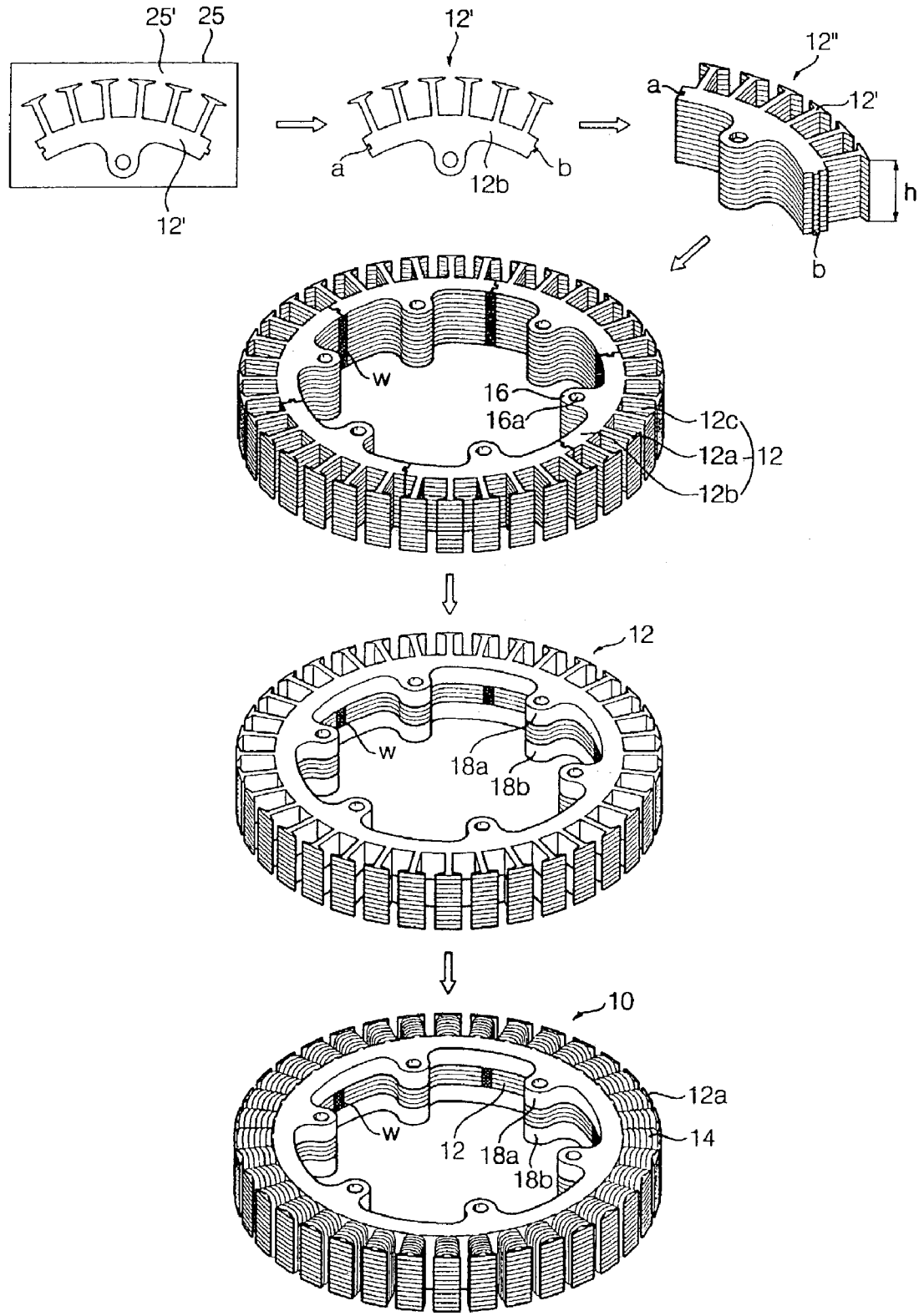
FIG. 2 is a schematic view illustrating a process for manufacturing a core of the conventional motor for washing machines.
Figure 3:
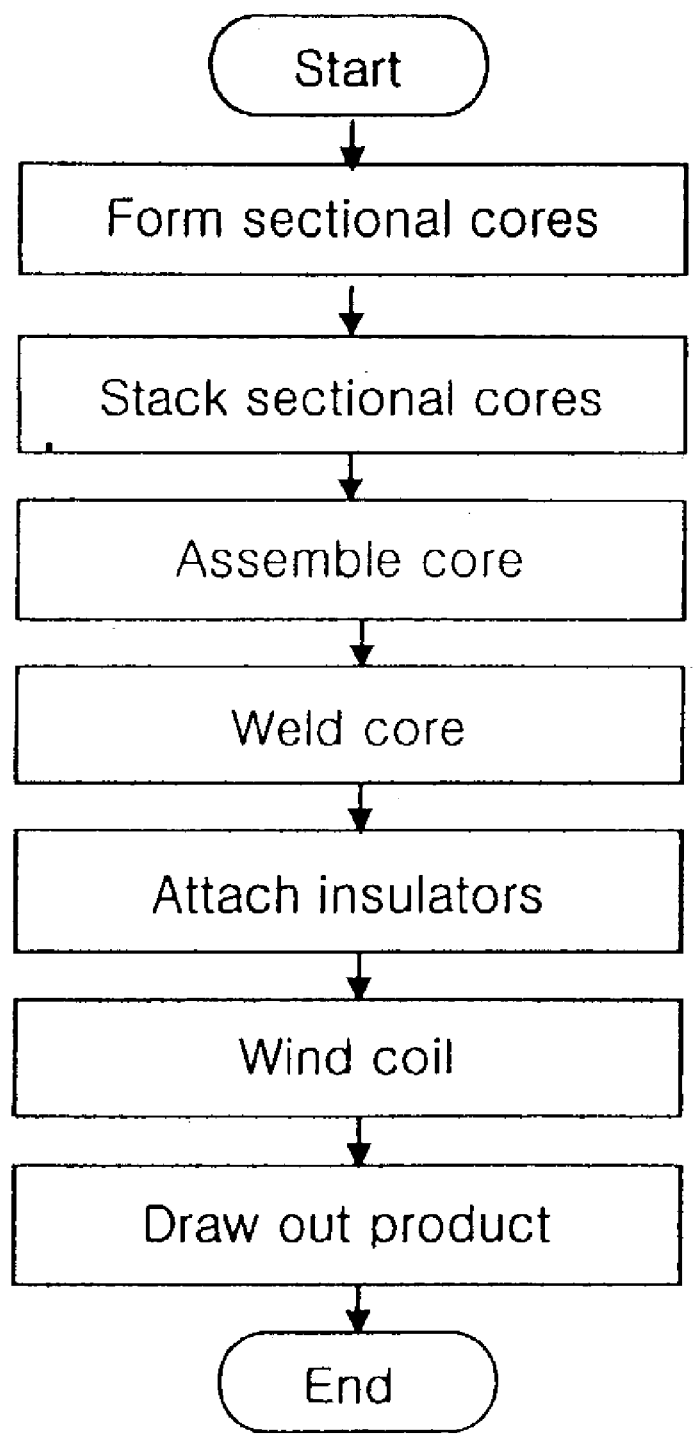
FIG. 3 is a flow chart showing the process for manufacturing the core of the conventional motor for washing machines.
Figure 4:
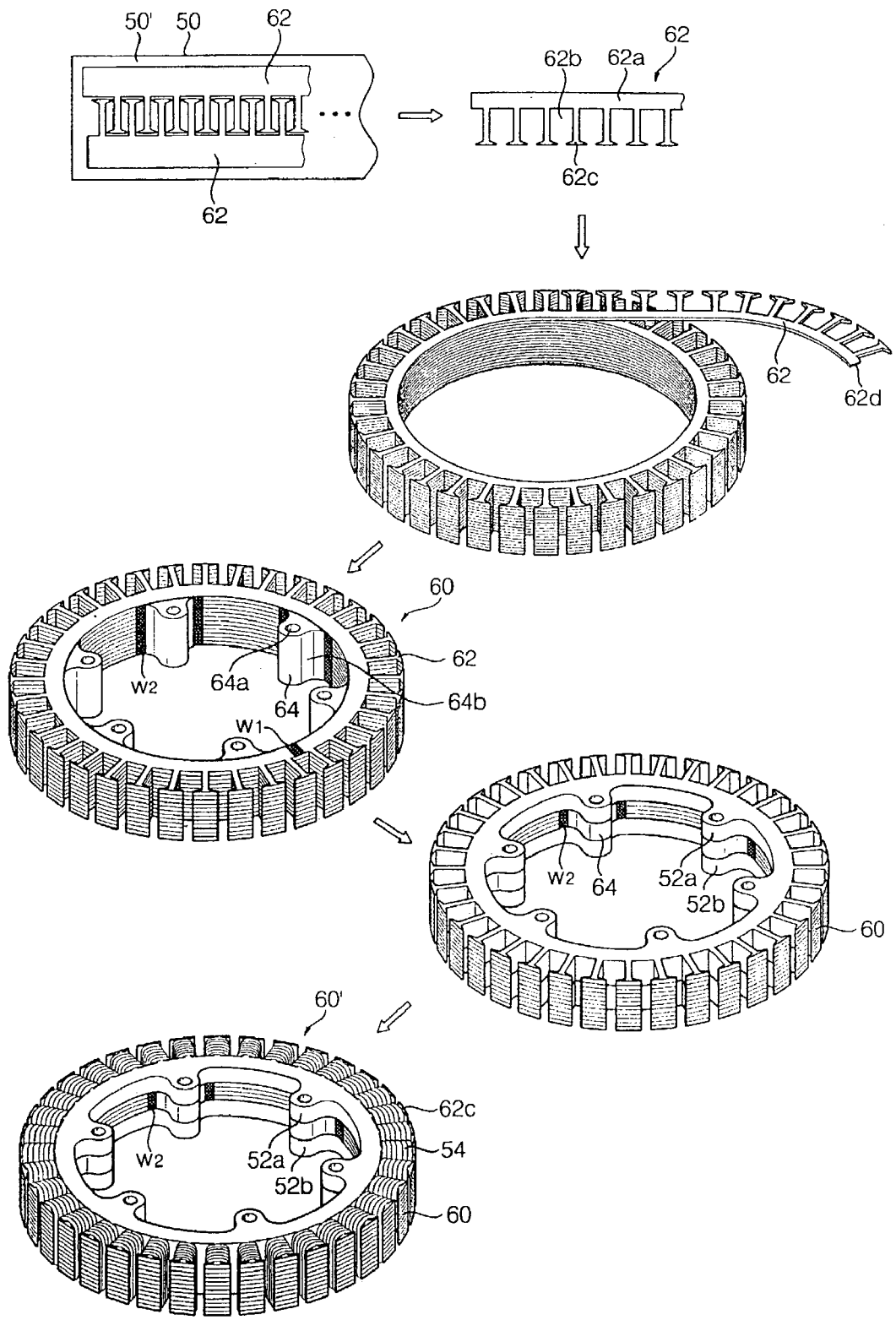
FIG. 4 is a schematic view illustrating a process for manufacturing a core of a motor for washing machines in accordance with the present invention.
Figure 5:
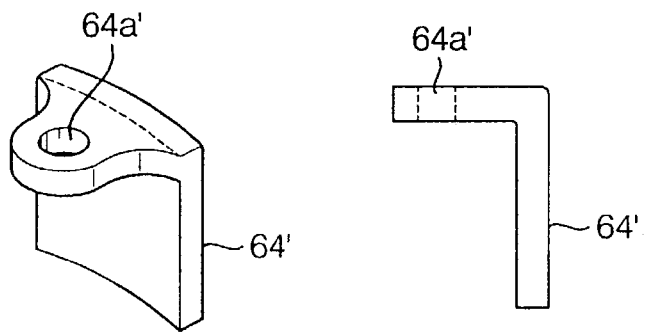
FIG. 5 is a schematic view showing another embodiment of a securing part illustrated in FIG. 4.
Figure 6:
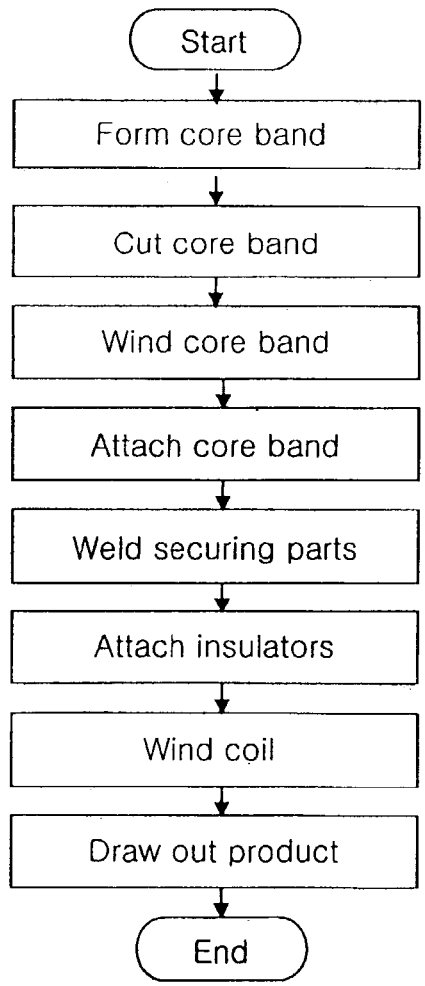
FIG. 6 is a flow chart showing the process for manufacturing the core of the motor for washing machines in accordance with the present invention.

Hereinafter, preferred embodiments of the present invention will be described in detail with reference to FIGS. 4 to 6.

A method for manufacturing a core of a motor for washing machines in accordance with the present invention comprises a core band forming step, a core band winding step, and a securing part fixing step. In the core band forming step, an electric steel plate 50 is punched by a press so as to form a core band 62 including a band-shaped yoke 62a, and a plurality of teeth 62c longitudinally formed on the yoke 62a and spaced from each other by slots 62b interposed therebetween. In the core band winding step, the formed core band 62 is spirally wound up to a designated height so as to complete a ring-shaped core 60. In the securing part fixing step, securing parts 64 for being secured to a housing of a washing machine (not shown) are fixed to an inner cylindrical surface of the wound ring-shaped core 60. Thereby, the wound ring-shaped the core 60 is completely manufactured.

In the core band forming step, in order to reduce the size of a remaining part 50' being left after punching the electric steel plate 50 so as to form the core band 62, a pair of the core bands 62 are formed on the electric steel plate 30 so that the both core bands 62 are opposite to each other in orientation and the teeth 62c of one core band 62 alternate with the teeth 62c of the other core band 62.

The core band 62 is formed of the electric steel plate 50 by a punching method using a press (not shown) with the same length as that of the electric steel plate 50. Therefore, after the formation of the core band 62, the core band 62 is cut into parts, each with a designated length required to manufacture a core 60.

In the core band winding step, the core band 62 is spirally wound so that the wound core band 62 has a designated diameter and the teeth 62c outwardly protrude from the wound core band 62, thereby forming the ring-shaped core 60.

Herein, the core band 62 is automatically wound by a winding machine (not shown) so as to form the ring-shaped core 60. Therefore, the core 60 is easily formed by a simple procedure using the winding machine. Further, after the ring-shaped coil 60 is formed, a start terminal (not shown) and an end terminal 62d of the winding of the core band 62 are welded to designated parts of the core 60 (W1). The welding of the both terminals of the core band 62 to the core 60 prevents the release of the winding of the ring-shaped core 60.

In the securing part fixing step, the six securing parts 64 spaced from each other by a designated distance are welded to the inner cylindrical surface of the ring-shaped core 60 (W2).

Herein, the securing parts 64 and 64' are made of the same material as that of the electric steel plate 50 or made of a different material from that of the electric steel plate 50, and are cylindrical or "7" in shape with the same height as that of the ring-shaped core 60. A contact surface of each of the securing parts 64 with the inner cylindrical surface of the ring-shaped core 60 has the same curvature as that of the inner diameter of the ring-shaped core 60. Bolt holes 64a and 64a' are longitudinally formed on each of the securing parts 64 and 64'. The bolt holes 64a and 64a' of the securing parts 64 and 64' correspond to bolt securing parts (not shown) of a washing tub so that the core 60 is bolted to the washing tub.

Table 1 shows results obtained by comparing a weight of a core band punched from an electric steel plate so as to form a designated sized core, and a weight of a remaining part of the electric steel part left after the punching, in the present invention, to those of the conventional case.

TABLE 1

|  | Conventional Case | Present Invention |
| --- | --- | --- |
| Total weight of electric steel plate (kg) | 9.5 | 9.5 |
| Weight of core band for forming core (kg) | 3.8 | 7.6 |
| Weight of remaining part (kg) | 5.7 | 1.9 |

As shown in the above table 1, since the weight of the core band punched from the electric steel plate so as to form the core of the present invention is twice of the conventional case, it is noted that the manufacturing method of the present invention can manufacture twice as many cores as the conventional manufacturing method.

A pair of insulators 52a and 52b are individually attached to the upper and lower surfaces of the ring-shaped core 60, thereby insulating the core 60 from the exterior. Then, a coil 54 is wound on each of the teeth 62c a designated number of times. Thereby, a stator 60' is completed.

In the method for manufacturing a core of a motor for washing machines in accordance with the present invention, a pair of the core bands are formed on an electric steel plate so that the both core bands are opposite to each other in orientation and the teeth of one core band alternate with the corresponding teeth of the other core band. Therefore, using the manufacturing method of the present invention, the electric steel plate is maximally utilized and the production cost is reduced.

Further, since the formed core band is wound to a designated height so as to form a ring-shaped core, and securing parts are welded to the inner cylindrical surface of the ring-shaped core so as to be connected to a washing tub by bolts, compared to the conventional manufacturing method in which a core is manufactured by interconnecting six sectional core assemblies obtained by stacking a plurality of sectional cores, the manufacturing method of the present invention in which a core is integrally formed by winding a core band is simple to perform and improves a degree of strength of the core.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a stator of a motor for washing machines comprising:

forming a core band by punching an electric steel plate, the core band including a band-shaped yoke and a plurality of teeth longitudinally protruding from the yoke;

winding the core band up to a predetermined height so as to form a ring-shaped core; and welding a plurality of securing parts to an inner cylindrical surface of the ring-shaped core, wherein each of the securing parts has a generally L-shaped configuration, the L-shaped configuration including a contact surface having a same curvature as the inner cylindrical surface of the ring-shaped core and an extension plate protruding inwardly from an end portion of the contact surface, the extension plate having a bolt hole longitudinally formed thereon.

2. The method for manufacturing a stator of a motor for washing machines as set forth in claim 1, wherein each of the securing parts has substantially the same height as that of the ring-shaped core.

* * * * *